235-379
SR
12/27/83 OR 4,423,313

United States Patent [19]

Tanigaki

[11] 4,423,313

[45] Dec. 27, 1983

[54] TRANSACTION PROCESSING SYSTEM

[75] Inventor: Shinya Tanigaki, Kyoto, Japan

[73] Assignee: Omron Tateisi Electronics Co., Kyoto, Japan

[21] Appl. No.: 340,252

[22] Filed: Jan. 18, 1982

[30] Foreign Application Priority Data

Jan. 20, 1981 [JP] Japan .................................. 56-7466
Apr. 14, 1981 [JP] Japan .................................. 56-56111

[51] Int. Cl.³ ................................. G06F 15/30
[52] U.S. Cl. ................................. 235/379; 235/383
[58] Field of Search ................................. 235/379, 383; 340/825.31; 364/408

[56] References Cited

U.S. PATENT DOCUMENTS

| | | | |
|---|---|---|---|
| 3,949,364 | 4/1976 | Clark | 340/825.31 |
| 4,166,945 | 9/1979 | Inoyama | 235/379 |
| 4,280,036 | 7/1981 | Fukatsu | 235/379 |
| 4,314,352 | 2/1982 | Fought | 235/379 |
| 4,321,672 | 3/1982 | Braun | 235/379 |

*Primary Examiner*—Harold I. Pitts

*Attorney, Agent, or Firm*—Cushman, Darby & Cushman

[57] ABSTRACT

Clerk's processing means employed in the present invention has an input device for business data, a preprocess memory for storing the business data, and a clerk display device for displaying the business data and the results of decision about the validity of bank transaction. This clerk's processing means is operated by clerk and able to execute the preprocess as part of a series of transaction processes.

Customer's processing means comprises an afterprocess memory for storing the business data and a guide display device for displaying the operating procedure for customer. This customer's processing means is operated by customer and able to execute the afterprocess as part of a series of bank transaction processes.

And decision control means makes a decision about the validity of a bank transaction basing upon the business data stored in the preprocess memory, displays the results of this decision on the clerk display device, and also transfers the business data to the afterprocess memory.

7 Claims, 14 Drawing Figures

RAM 4

RAM 6

TRANSACTION PROCESSING SYSTEM

BACKGROUND OF THE INVENTION

This invention relates to a transaction processing system (for example, bank transaction processing system) which executes the transaction processes such as cash deposits and cash payments at the clerk's counter in business facilities such as banks.

As well-known, automatic cash deposit machines, automatic cash payment machines, or automatic cash payment-deposit machines are widely in practical use at present, and are able to automatically perform transactions in banking such as cash depositing and paying by using bankbooks or bankcards with magnetically recorded personal codes and account numbers in order to simplify the tellers' work in banks.

These conventional automatic bank transaction processing machines will automatically perform simplified and standardized bank transaction processes such as readout and collation of bankbooks and bankcards, discrimination of kind and truth of bills, store or release of counted bills, printing on bankbooks and so forth, but these kinds of automatic machines are not necessarily able to process all bank transactions for all customers in actual phase of use. That is, collation of seal impression, checking of checks, confirmation of seal impression, and giving judgement on true bills which cannot be done by these automatic machines must be performed by clerks (for example tellers) in banks.

Conventionally, ordinary banks have automatic bank transaction processing machines as described above but, at the same time, have tellers' counters to process such bank transactions as described above which cannot be processed by the customer's operation alone. In the case of a bank transaction process which is requested by a customer at the tellers' counter, the series of transaction processes required are all performed by or through tellers from beginning to end; for example, the teller is required to receive the bankbook and cashing request slip from a customer, to collate the seal impression, to count bills, to print the necessary record on the bankbook, and to return both bills and the bankbook to the customer in the case of a cash payment transaction. Because of this, a considerably long period of time is needed in processing each transaction by the teller and this mainly causes a low bank transaction processing capacity at the teller's counter.

BRIEF SUMMARY OF INVENTION

An object of this invention is to provide a transaction processing system capable of allowing operation of a preprocess or steps only really requiring clerk's work at a clerk side device out of a series of work processes, and capable of allowing a customer to operate a simple and standard afterprocess steps which may be done by a customer at a customer side device.

Another object of this invention is to provide a transaction processing system capable of allowing preprocesses continuously by clerks for plural customers even though afterprocesses by customers are delayed, and thus capable of greatly improving the processing efficiency by clerks.

Another object of this invention is to provide a transaction processing system capable of properly guiding and leading each customer by clerk, which will transmit the business data prepared during the preprocess to a central device, receive from the central device the return data containing the results of a decision about the validity of the transaction, and display the results of decision on teller display device.

Another object of this invention is to provide a bank transaction processing system capable of allowing each customer to perform by himself the delivery of cash and printing on the bankbook as an afterprocess out of bank transaction processes.

Another object of this invention is to provide a bank transaction processing system capable of allowing each customer to perform an afterprocess by using a number card as a transaction medium on which an indiviual number is recorded instead of using the bankbook.

A further object of the invention is to provide a bank transaction processing system capable of preventing any disturbance by rejecting a transaction requiring coin releaser during the preprocess when the coil releaser in customer process means has been invalidated.

A still further object of this invention is to provide a bank transaction processing system capable of allowing flexible operation of the system by combining card reader, slip issuer and keyboard with bankbook processor, cash releaser and guide display device in the customer process means and by allowing the whole of this combination to operate as an automatic cash paying machine.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
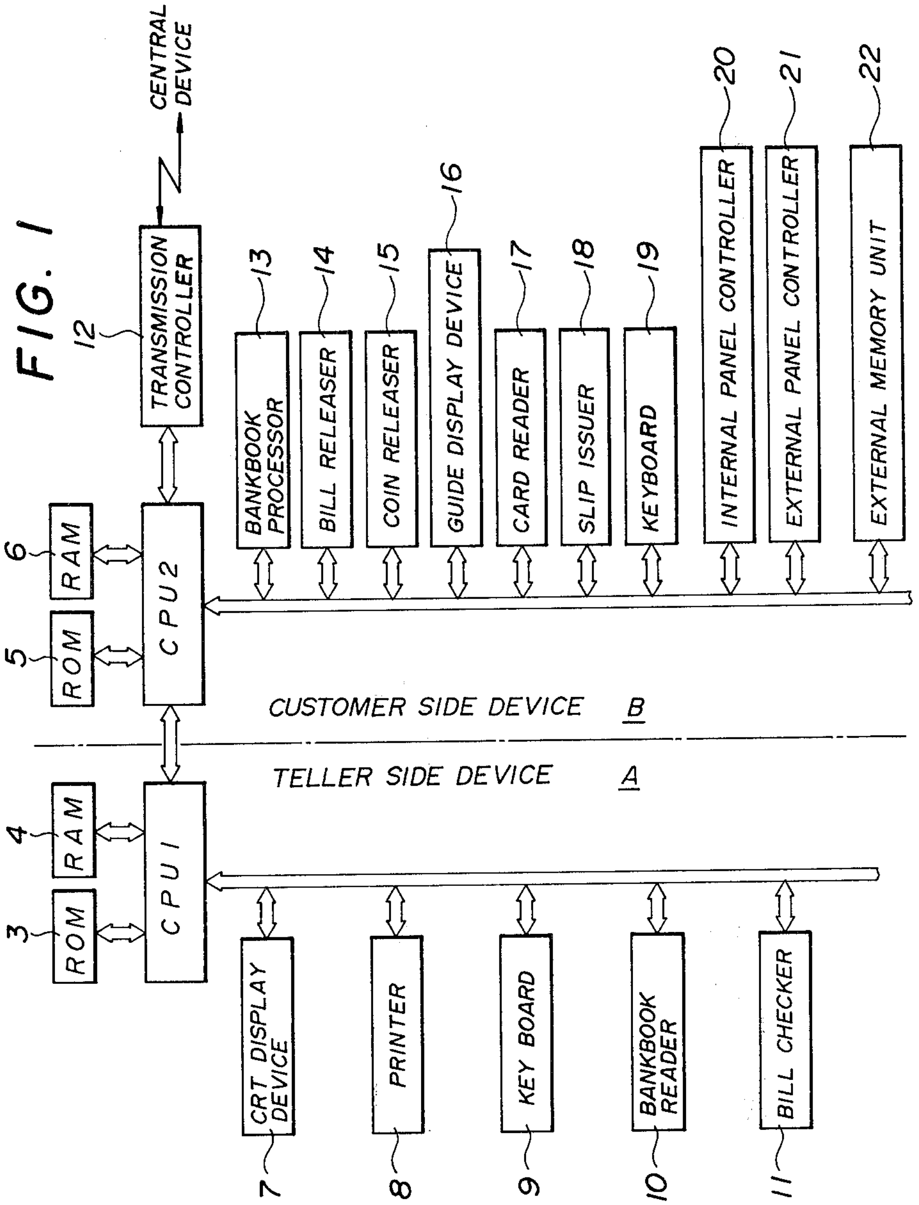
FIG. 1 is a block diagram showing the whole of a bank transaction processing system, embodying the invention.

FIG. 1 shows an overall configuration of the bank transaction processing system of the present invention. This system can be roughly divided as an embodiment into a teller side device A to be operated by a teller inside of the counter in a bank, and a customer side device B to be operated mainly by a customer outside the counter in the bank. The teller side device A has a control nerve center consisting of a CPU 1 (central processing unit), a ROM 3 (read-only memory) and a RAM 4 (random access memory). The CPU 1 controls a CRT display device 7 used as a teller's display device, a printer 8 for printing slips as copies for the bank, a keyboard 9 for entering various kinds of inputs by the teller, a bankbook reader 10 for recording data on a portion of a magnetic stripe of a bankbook (these data are called "bankbook data"), and a bill checker 11 for judging true bills and counting them.

According to this embodiment, a system configuration based on master slave method is employed with the CPU 1 as a master CPU, a slave CPU assigned to control the CRT display device 7, printer 8 and keyboard 9, a slave CPU assigned to control the bankbook reader 10, and a slave CPU assigned to control the bill checker 11. Also, input/output devices 7, 8, 9, 10 and 11 are separately placed in plural housings for an easier arrangement for use by tellers instead of building them in the same single housing.

The customer side device B has a control nerve center consisting of a CPU 2, a ROM 5 and a RAM 6, and the CPU 2 centrally controls a transmission controller 12 for data transfer with the central unit which controls the business data, a bankbook processor 13 including a bankbook printer and a read/write device for said bankbook data, a bill releaser 14, a coin releaser 15, a guide display device 16, a card reader 17 for reading magnetically recorded data on a card which is issued together with a bankbook as a pair, a slip issuer 18 for printing and issuing customers' slips, a keyboard 19 to be operated by customers, an internal panel controller 20 equipped with a date setter, various kinds of operation indicators, etc., an external panel controller 21 equipped with operation indicators for various kinds of said devices and various kinds of operation transfer switches, and an external memory unit 22 for storing several kinds of programs to be executed by the CPU 2. This customer side device B also employs a system configuration based on the master slave the same as that of teller side device A, which uses the CPU 2 as master CPU and plural slave CPU's assigned for the control of various kinds of said input/output devices.

The customer side device B of this embodiment is provided with an operation mode (this is called "afterprocess mode") functioning as part of the bank transaction processing system of the present invention in which the preprocess and afterprocess are assigned by both teller and customer (the detail will be described sequentially later), and another operation mode (this is called "automatic cash dispenser mode") functioning the well-known automatic cash payment machine, and either one of these modes can be selected as required. That is, a program for said afterprocess mode and a program for the automatic cash dispenser mode are stored in said external memory unit 22. Thus, if the power source is turned on at this device B, the program for the afterprocess mode is automatically read in the RAM 6, the device B becomes ready to operate in afterprocess mode, the automatic cash dispenser program is read in the RAM 6 by a mode change operation which will be described later, and then the device B is ready to operate as an automatic cash dispenser (this is an unmanned operation from bank's point of view). Therefore, the main portion of the customer side device B (such as bankbook processor 13, bill releaser 14, coin releaser 15, guide display device 16, card reader 17, slip issuer 18, keyboard 19, etc.) is built in a housing which is similar in appearance to an ordinary automatic cash payment machine and installed at a place outside the teller's counter where the customers can easily operate this device. Though clarified by the description later, the card reader 17, slip issuer 18 and keyboard 19 are not necessary while the device B is being operated in the afterprocess mode because they are necessary only during the automatic cash dispenser mode.

Also, the external panel controller 21 for device B is arranged separately from the housing for said main portion and is installed at a place inside the teller's counter whereby a teller will be able to easily see and operate this controller.

Figure 2:
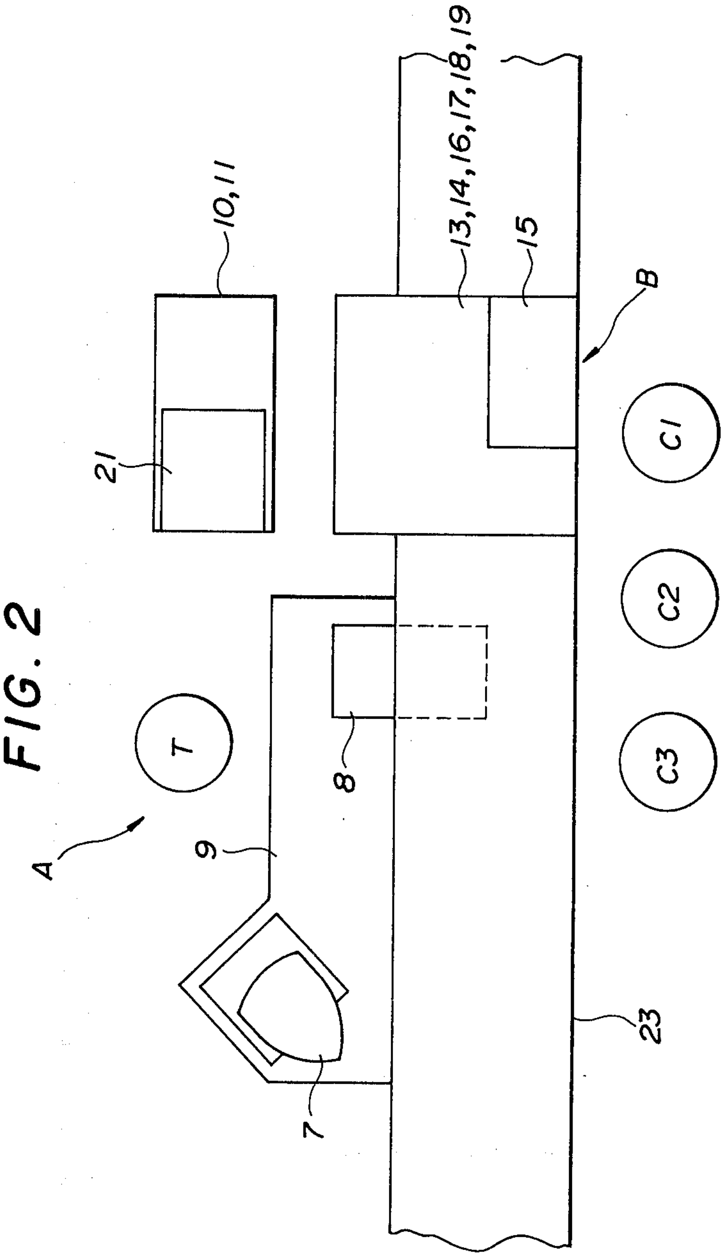
FIG. 2 is a plan view showing an example of layout in bank of each device employed in the system of FIG. 1.

FIG. 2 shows a rough plan view indicating an example of layout of various devices described above at the teller's counter in a bank, in which a counter 23, a teller T inside the counter 23, and three customers C1, C2 and C3 outside the counter 23 are respectively indicated.

Figure 3:
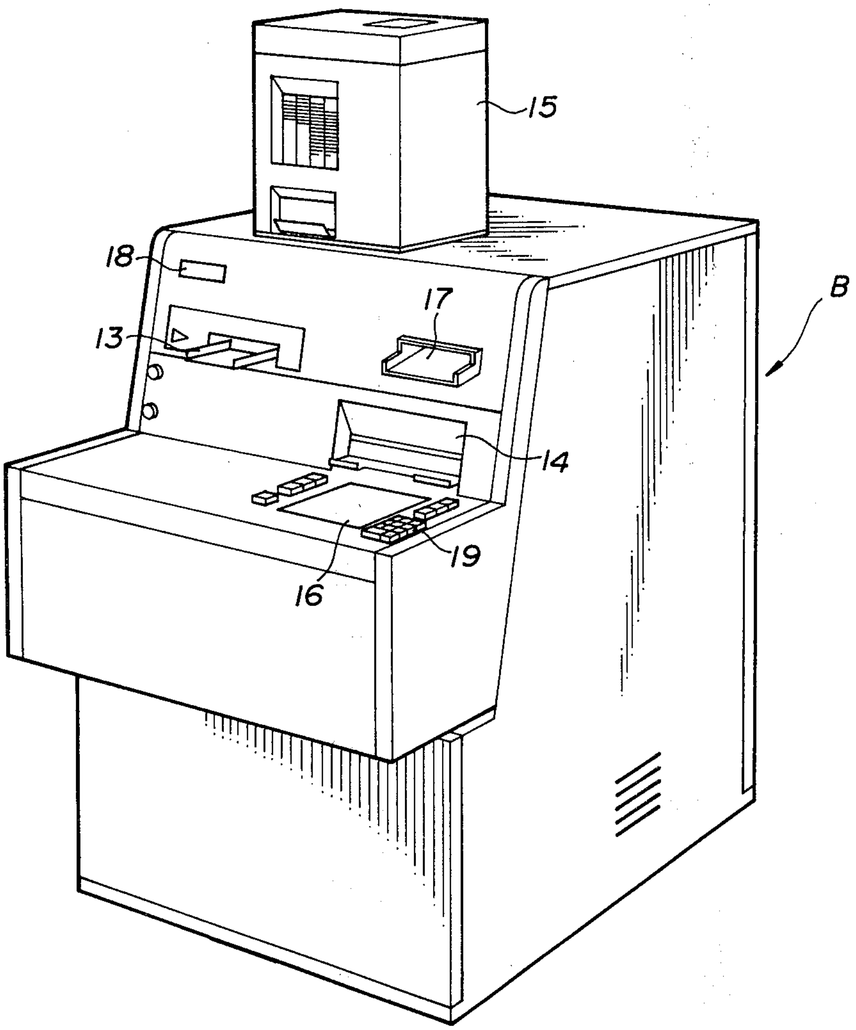
FIG. 3 is an isometric perspective view illustrating an external view of customer side device of the present invention.

FIG. 3 shows an external view of the main body containing said main portion of the customer side device B.

Also, the CPU 1 of teller side device A and the CPU 2 of customer side device B are connected to each other for predetermined data transfer between them as described later.

The processing operation performed by the CPU 1 and CPU 2 will be described hereinafter.

Figures 4A, 4B:
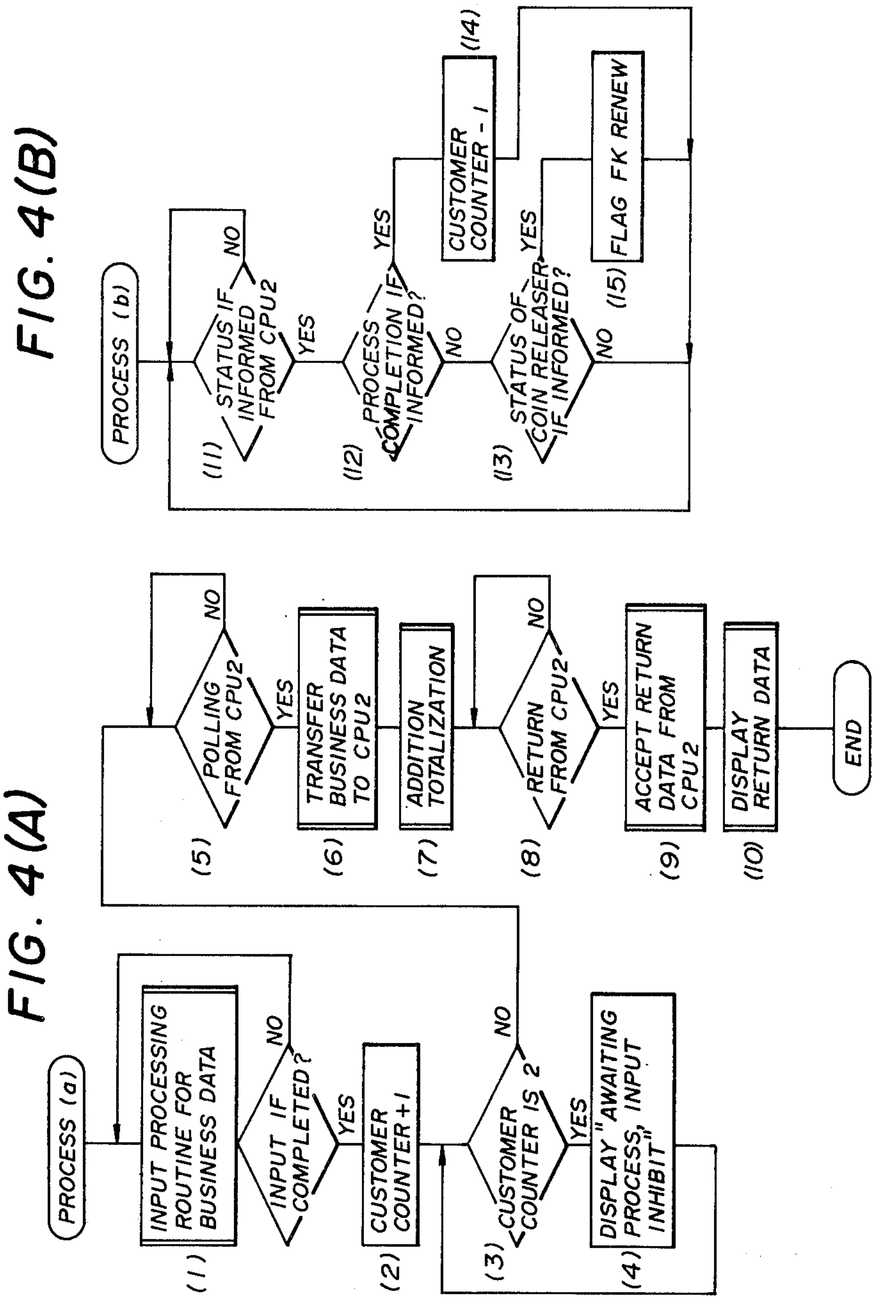
FIGS. 4A and 4B are flowcharts showing the configuration of program to be executed by CPU 1 of the invention.

FIGS. 4A and 4B are flowcharts showing the processing program for CPU 1 (stored in ROM 3), in which process (a) forms the main routine, and process (b) is executed by the CPU 1 in parallel with the process (a) by means such as interruption.

Figure 5B:
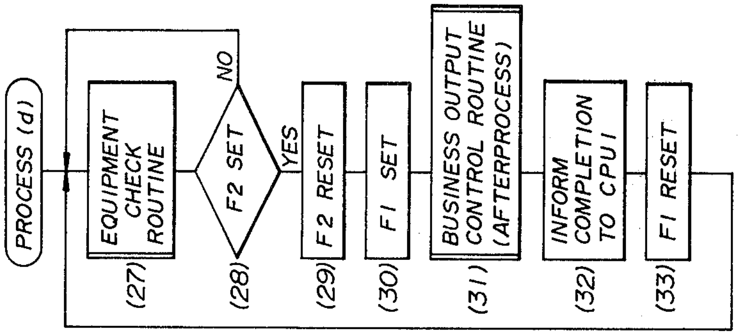
FIGS. 5A and 5B are flowcharts showing the configuration of afterprocess mode program to be executed by CPU 2 of the invention.
Figure 5A:
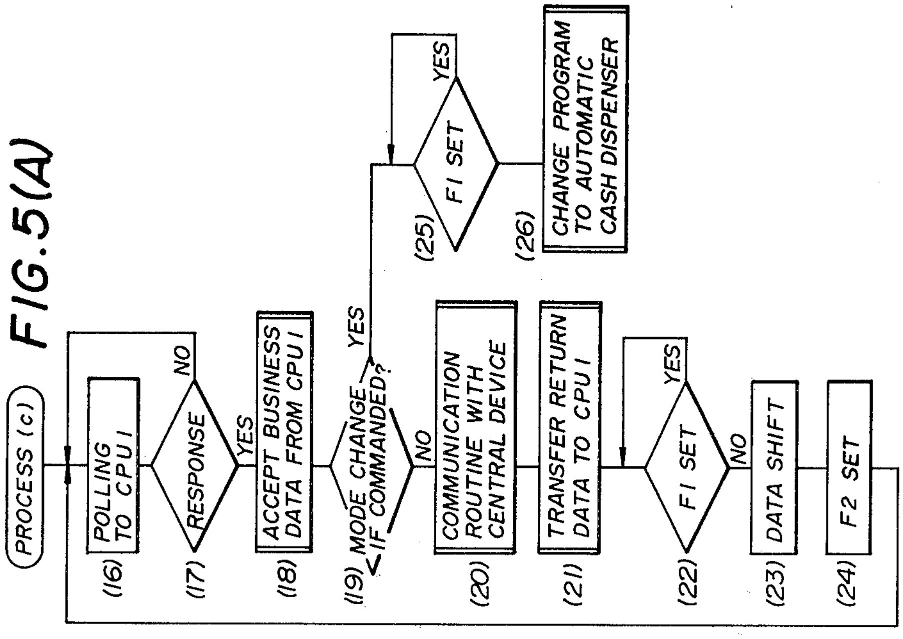
Figure 6:
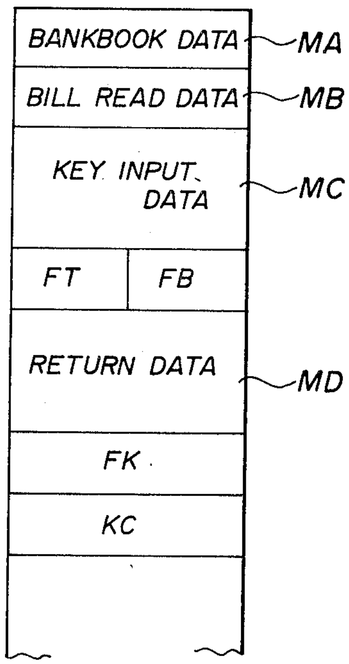
FIG. 6 is a main data area map of RAM 4 of the invention.
Figure 7:
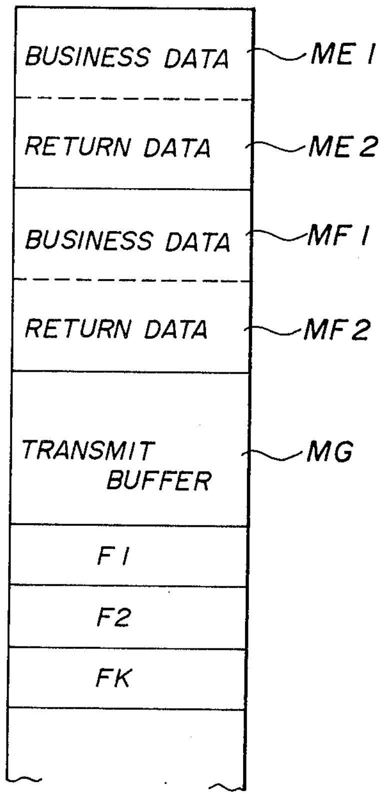
FIG. 7 is a main data area map of RAM 6 of the invention.

FIGS. 5A and 5B are flowcharts of a program for said afterprocess mode which is executed by the CPU 2, in which both the processes (c) and (d) are executed in parallel. Also, FIGS. 6 and 7 show data maps for the RAM 4 and RAM 6 respectively.

Figure 8:
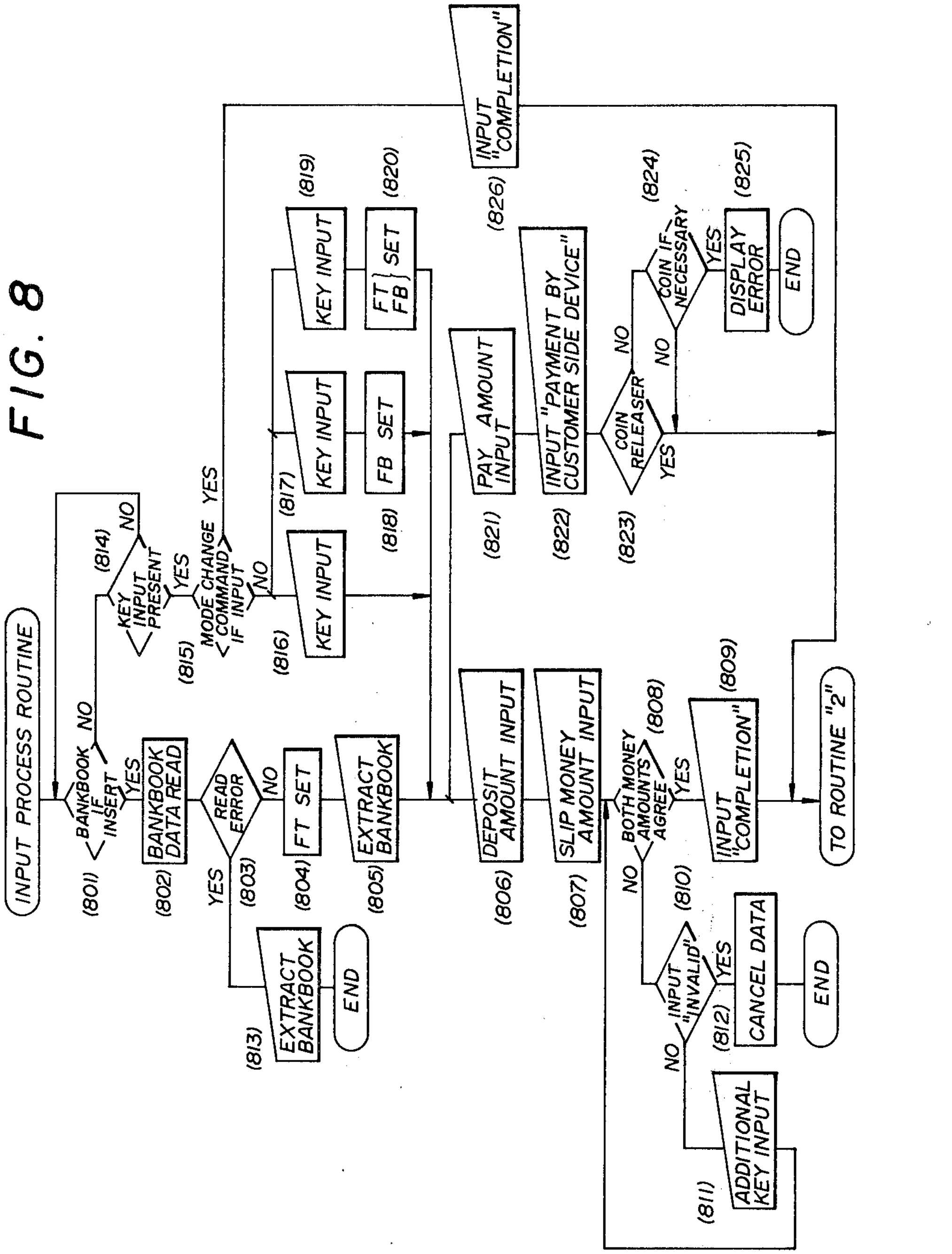
FIG. 8 is a flowchart expressing the detail of input processing routine shown in FIG. 4 in combination with teller's operation.

At first, the process (a) at the side of CPU 1 will be sequentially described hereinafter. The first routine (1) at the process (a) will control processing of business data for a customer which are entered by a teller by operating the keyboard 9, bankbook reader 10 and bill checker 11, to store the business data in the RAM 4, to successively display the business data entered on the CRT display device 7, and to print the predetermined data out of the printer 8 and business data on a slip. FIG. 8 is a flowchart expressing the detail of the business data input processing routine (1) in the form combined with teller's operation for an easier understanding, and the input processing of the business data will be explained below by making reference with this flowchart.

As well known already, a customer is required to make a deposit slip when depositing money to a bank and a withdrawal slip when withdrawing money. Customer's name and amount of deposit will be shown on the deposit slip by the customer. Then, the amount of withdrawal instead of the amount of deposit will be filled in the withdrawal slip, and the customer's seal is impressed on it. In the case of depositing, a customer must give a deposit slip filled in, a bankbook, cash of the amount to be deposited and checks, if any, to the teller. Cash may include bills as well as coins. In the case of withdrawal, a customer must give a withdrawal slip filled in and a bankbook to the teller. Then, the teller will collate the seal impression on the withdrawal slip with the registered seal impression on the bankbook in the case of withdrawal to check whether they agree with each other. Then, the teller will insert the bankbook received from the customer to a bankbook reader 10. When the insertion of this bankbook is detected at the device A (step 801), bankbook data recorded on the magnetic stripe portion of the bankbook (account number, print complete row, balance, etc.) are read out (step 802), bankbook data read out are, if there is no read error (step 802), stored in a bankbook data area MA of the RAM 4 and displayed on the CRT display device 7, a bankbook flag FT preset in the RAM 4 is set (step 814), and then the teller will pull out the bankbook returned from the bankbook reader 10 (step 805). The above procedure is almost the same for both deposit and withdrawal except for the collation of seal impression. However, the procedure is different for deposit and withdrawal in the following case.

That is, in the case of deposit, the teller will insert bills handed over from a customer to the bill checker 11 and depress a bill counting key on the keyboard 9 for automatically counting the bills. At the device A, the amount of bills is correctly read by the bill checker 11, bill read data of the counted bills (kind and number) are stored in the bill read data area MB of the RAM 4 and displayed on the CRT display device 7, and the bill read data are printed out at the printer 8. Bills which could not be judged by the bill checker 11 will be returned. These returned bills and coins and checks received from the customer are counted by the teller, and data expressing the amounts and kinds are entered by the teller by operating the keyboard 9. At the device A, these key input data are stored in the key input data area MC of the RAM 4 and displayed on the CRT display device 7. The above is the procedure for entering the amount of deposit received by step 806. Then, the teller will enter the amount of deposit shown on the deposit slip with the keyboard 9 (step 807). This amount of deposit is displayed on the CRT display device 7. Then, whether the actual amount of deposit received of the above will agree with the amount of deposit on the slip is checked (step 808). If both the amounts agree with each other, the teller will perform an input complete operation on the keyboard 11 (step 809) and then this input processing routine (1) will be completed. If both the amounts described above do not agree with each other, the input data must be corrected or invalidated (steps 810, 811 and 812). Though the decision of the step 808 may be performed by the teller by looking at the display on the CRT display 7, it is preferable to make a decision by the CPU 1 and display its results on the display device 7.

If a customer has designated a transaction of withdrawal, the teller will enter the amount of withdrawal shown on the withdrawal slip with the keyboard 9 (step 821). This amount of withdrawal is stored in the area MC of the RAM 4 and displayed on the CRT display device 7. Then, the teller will depress a "payment by customer side device" key on the keyboard 9 (step 822). Then, in the CPU 1, the coin releaser flag FK in the RAM 4 is checked to determine whether this flag is set (valid) or not. If the flag FK is set, then the input processing routine (1) is completed at this stage and the operation advances to routine (2). If the main switch of the coil releaser 15 has been turned off as described later, the flag FK is already reset so that a NO decision is made in step 823 and the operation advances to step 824. In the step 824, it is checked by the CPU 1 whether the withdrawal transaction being processed requires coins; that is, whether a fraction smaller than 1,000 Yen is contained or not in the data of amount of withdrawal stored in the area MC of the RAM 4. If coins are not required, then the input processing routine (1) is completed at this stage, and the operation advances to routine (2). If coins are required for a transaction of withdrawal while the coin releaser 15 is invalid, then an error indication which means that this transaction is invalid since coins cannot be paid is displayed on the CRT display device 7 (step 825) and the subsequent procedure is left to the teller (no advance to the routine (2)).

When the above input processing routine (1) is completed and advance to the next routine (2) occurs, the CPU 1 adds "1" to the customer counter KC set in the RAM 4. In the subsequent routine (3), whether the counting value of the customer counter KC is "2" or not is checked. If the customer counter KC has a value of "2", then the operation advances to the routine (4), an indication which inhibits a person from entering subsequent business data is displayed on the CRT display device 7 to inform the teller about it, and the operation returns to the routine (3). If the customer counter KC has a value smaller than "2", then an advance to the routine (5) occurs and a polling from the CPU 2 is awaited. If a polling from the CPU 2 occurs, an advance to the routine (6) occurs in response to this polling, and the business data stored in the areas MA, MB and MC of the RAM 4 as stated above (including the bankbook flag FT and number card flag FB) are transferred to the CPU 2. In the subsequent routine (7), the total amount of the transaction being handled is calculated, and a return from the CPU 2 is then awaited in routine (8). As described later in detail, the CPU 2 communicates with the central device through the transmission controller 12 in accordance with said business data received from the CPU 1, receives the return data from the central device, and transfers the data to the CPU 1. The routine (8) of CPU 1 is the one which waits the transfer of these return data. When the return data are transferred from the CPU 2 to the CPU 1, these return data are stored in the area MD of the RAM 4 during the routine (9), and the return data are displayed on the display device 7 during routine (10).

The return data from the central device contains the results of a decision about the validity of business data being handled; that is, a notice of either approval or rejection for the transaction is contained. In the case of approval for the transaction, the amount of deposit received, hour and minute, year, month and day, item, branch number, account number and customer's name are displayed in the predetermined format on the display device 7 by said display routine 10. In the case of rejection for the transaction, the rejection and reason for it such as an absence of relevant account number or a balance lower than the amount of withdrawal requested are displayed on the display device 7 by the execution of routine (10).

When the teller sees said display by the routine (10), he will then return the bankbook to the customer and suggests a next procedure to be taken to the customer.

For example, in the case of approval for transaction, the teller will suggest to the customer that the customer performs the subsequent afterprocess by himself at the customer side device B, and the teller will guide the customer. In the case of rejection for the transaction, the reason for the rejection will be told to the customer.

The process (a) of CPU 1 is completed at routine (10), and it becomes possible to execute the input processing routine of the routine (1) for the business data. Thus, the teller is now ready to start the input operation for a next customer.

The process (b) of the CPU 1 will be now described below. The process (b) is the process for updating the flag FK of customer counter KC of the RAM 4 and the coin releaser after receiving a status informing signal from the CPU 2 as described later. That is, if the status informing signal is detected during the routine (11) and if this notice is detected and found to be the notice for informing of the completion of the afterprocess during the routine (12), then the content of the customer counter KC is reduced by "1" during routine (14). Also, if the status change notice of the coin releaser 15 is detected during the routine (13), then flag FK is set or reset in response to the change during routine (15).

The processing operation by the CPU 2 of the customer side device B shown in FIG. 5 will be now described below. There are both the process (c) and process (d) which are to be executed in parallel, but the process (c) handles the data transmission between the CPU 2 and the central device or CPU 1. In the process (c), a polling is requested to the CPU 1 at the first routine (16), and whether there is a formal response from the CPU 1 is checked in the subsequent routine (17). The same operation is repeated until a response from the CPU 1 is detected.

When a response from the CPU 1 is detected, an advance to routine (18) occurs, said business data sent from the CPU 1 (including FT and FB) are received and the data are stored in the area ME 1 of the RAM 6. That is, because the routine (6) is executed in the CPU 1 and the routine (18) is executed in CPU (2), the business data created in the RAM 4 (corresponds to said first memory) by the teller's input operation are transferred to the area ME 1 of RAM 6 (corresponds to said second memory).

In the subsequent routine (19), whether the data received to the area ME 1 of the RAM 6 is "automatic cash dispenser mode change command" which is different from the business data is checked.

How this "automatic cash dispenser mode change command" is created will be described later. However, the description will be made here by assuming that the formal business data have been transmitted from the CPU 1. In this case, a decision of NO is made during the routine (19) and the operation advances to routine (20). In the routine (20), a transmit telegram to the central device is created in the area MG of RAM 6 in accordance with the business data in the area ME 1 of the same RAM 6, the transmit telegram is transmitted to the central device through the transmission controller 12, the sending of the return data for the transmitted telegram (business data) from the central device is awaited, the return data are received when they are transmitted, and then the return data are stored in the area ME 2 of the RAM 6. This area ME 2 forms a pair together with the area ME 1 and corresponds to other areas in said second memory.

When the transmit routine (20) with the central device is completed, the return data received from the central device to the area ME 2 of the RAM 6 are transferred also to the CPU 1 during subsequent routine (21). Then, the CPU 1 executes said routine (9) and receives these return data.

During subsequent routine (22), resetting of under-afterprocess flag F1 which was set in the RAM 6 is waited. This under-afterprocess flag F1 is set when business output control routine (31) is being executed in the process (d) described later.

When the under-afterprocess flag F1 is reset, an advance to subsequent routine (23) occurs, the business data in the area ME 1 of the RAM 6 are transferred to the area MF 1, and the return data of the area ME 2 are transferred to the area MF 2. That is, the areas ME 1 and ME 2 correspond to said second memory and the areas MF 1 and MF 2 correspond to the third memory, and the routine (23) will transfer the business data and return data in the second memory to the thrid memory.

During the subsequent routine (24), the afterprocess approval flag F2 in the RAM 6 is set and the operation returns to the first routine (16).

If return data from the central device indicate a rejection of transaction stated before during the routine (20), then the CPU 2 executes the routine (21) and the operation returns to the first routine (16), so that the business data and return data for which the transaction is rejected by the central device are not transferred to the areas MF 1 and MF 2 of the RAM 6 (third memory). There is an alternative means to the above. That is, if return data showing a rejection of transaction is received from the central device, the bankbook flag FT and number card flag FB in the business data in the area ME 1 of RAM 6 are reset during the routine (20), the data are reset in the case of withdrawal transaction, and the subsequent routines (21), (22), (23), and (24) are executed in the order listed. As a result, the afterprocess based on the business data and return data for which a rejection of transaction is made will be instantaneously completed without any practical execution as described later more clearly.

Figure 10:
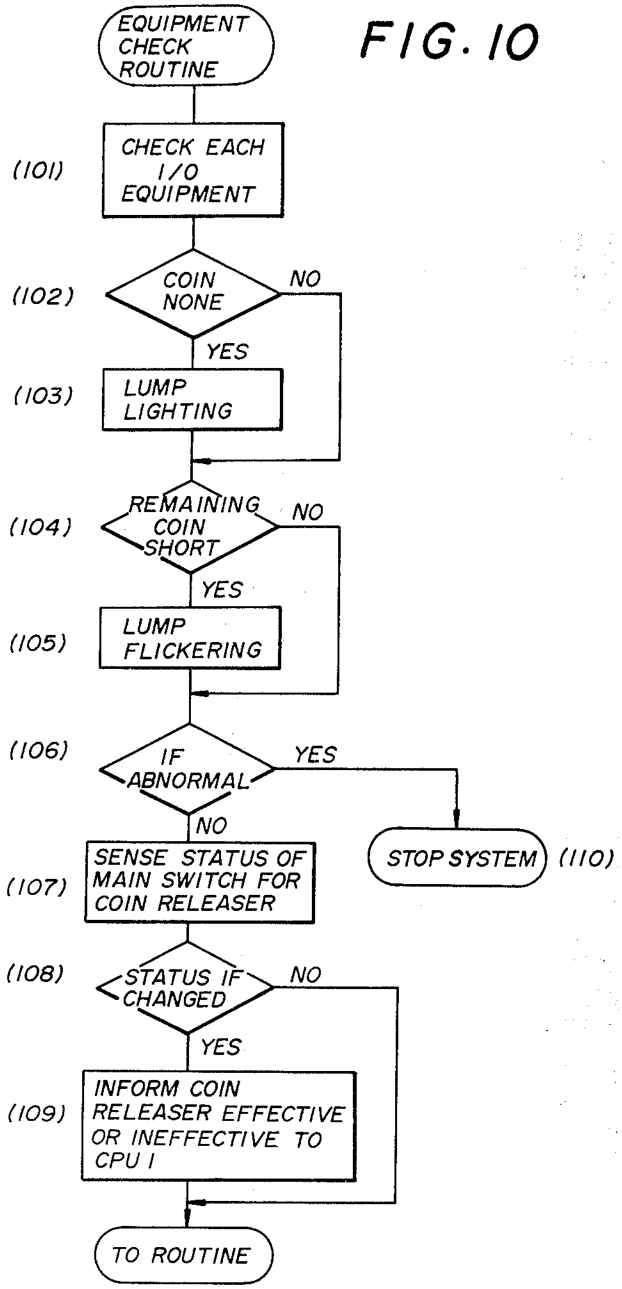
FIG. 10 is a flowchart showing the partial detail of an equipment check routine showing in FIG. 5.

The process (d) will be described hereinafter. The first routine (27) checks the status of each of input/output devices at the customer side device B, indicate the required statuses on the internal panel controller 20 and external panel 20, and also informs the CPU 1 of the statuses described above. This routine (27) is repeatedly executed until the setting of afterprocess approval flag F2 is detected during subsequent routine (28). FIG. 10 is a flowchart showing part of the equipment check routine (27) in detail. This routine (27) will be described below by making reference to FIG. 10. At first, the status of each input/output device is sensed in the predetermined sequence (step 101) and, as a result, if coins in the coin releaser 15 are detected to be completely gone (step 102), then the coin lamp on the external panel controller 21 is turned on (step 103). Also, even though the coins are not completely gone but are detected to be lower than the present basic quantity (step 104), said coin lamp on the external panel controller 21 is flashed (step 105). In addition, if any abnormal state such as bills completely gone from the bill releaser 14 is detected (step 106), such abnormal state is indicated on the internal panel controller 20 and external panel controller 21, and the afterprocess system by the device B is stopped (step 110).

Said coin lamp on the external panel controller 21 is located at a place easily seen by the teller. If the teller will notice any flashing or continuous turning-on of the coin lamp, he will turn off the main switch for the coin releaser 15 (this is called "coin switch") located on the external panel controller 21. When this coin switch is turned off, the operation of the coin releaser 15 will be stopped.

Now returning to FIG. 10, the CPU 2 senses the status of said coin switch as part of the input/output equipment check (step 107) and, if the coin switch status has changed from that of previous sensing, the change of coin switch from ON to OFF or from OFF to ON is informed to the CPU 1 as status notification (step 109). This status notification is received as described before when the CPU 1 executes the process (b). Also, the CPU 2 sets or resets the coin releaser flag FK set in the RAM 6 depending upon the status of the coin switch during step 109.

The equipment check routine (27) described above is repeated until the afterprocess approval flag F2 will be set. If the flag F2 is set during the routine (24) of process (c) (new business data and return data have been transferred to the areas MF 1 and MF 2 of RAM 6 at this time), then the setting of the flag F2 is detected during the routine (28) of the process (d) and the operation advances to routine (29) and further.

In routine (29), the flag F2 is reset, the under-afterprocess flag F1 is set during subsequent routine (30), and then the next business output control routine (31) is executed. This business output control routine (31) waits customer's insertion of bankbook and others to the bankbook processor 13 basing upon the business data and return data stored in the areas MF 1 and MF 2 of the RAM 6 and operates the bankbook printer, bill releaser 14, coin releaser 15 and guide display device 16 in the bankbook processor 13 for executing the afterprocess. Since the detail of this routine (31) will be sequentially described later, the process (d) upon completion of the routine (31) will be explained below. When routine (31) is completed, the completion of afterprocess is notified as status notification to the CPU 1 in subsequent routine (32), the under-afterprocess flag F1 is reset during subsequent routine (33), and the operation returns to the first equipment check routine (27). By executing the process (b), CPU 1 receives an afterprocess complete notification from the CPU 2, and then reduces the value of customer counter KC as described before.

Figure 9:
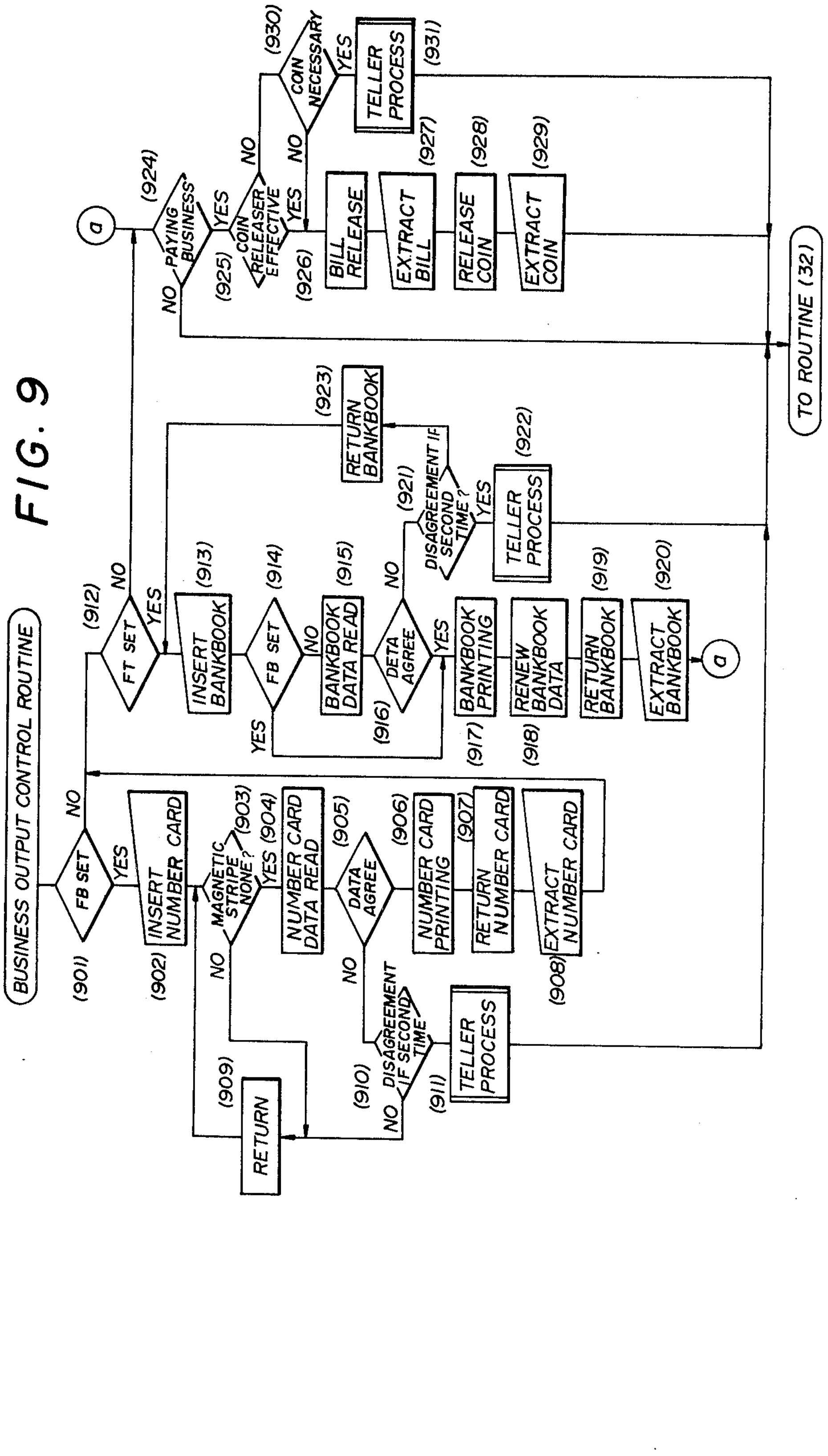
FIG. 9 is a flowchart showing the detail of a business output control routine of FIG. 5 in combination with the customer's operation.

FIG. 9 is a flowchart showing the detail of the business output control routine (31) in combination with customer's operation for simplifying the description. This business output control (afterprocess) will be described hereinafter by making reference to FIG. 9. An example of operation of the input processing routine (1) for business data explained previously was a deposit or withdrawal transaction using a bankbook. In this case, only the flag FT out of the bankbook flag FT and number card flag FB in the business data is set, and the flag FB remains reset. The business output control in the above case will be sequentially explained hereinafter.

In FIG. 9, with respect to flags FT and FB transferred to the area MF 1 of the RAM 6, the resetting of the flag FB is detected during step 901 and the setting of the flag FT is detected during step 912, and the customer's insertion of bankbook to the bankbook processor 13 is waited during step 913. When the bankbook is inserted, the bankbook data in that bankbook are read out (step 914) since the flag FB is already reset, and then the bankbook data read out are compared to the data in the areas MF 1 and MF 2 of the RAM 6 to determine whether the account number and others will agree (step 916). If the data agree with each other, the contents of transaction are printed on said bankbook inserted in accordance with the data in the areas MF 1 and MF 2 of the RAM 6 (step 917), some of the bankbook data such as print complete row and balance in the bankbook are updated (step 919), and the bankbook is returned. The customer will then pull out the returned bankbook (step 920). In subsequent step 924, whether the transaction being handled is either withdrawal transaction or deposit transaction is judged basing upon the data in the areas MF 1 and MF 2 of the RAM 6. In the case of deposit transaction, since the afterprocess is completed after printing on the bankbook and updating the bankbook data, this routine (31) is completed and an advance to subsequent routine (32) is made. In the case of withdrawal transaction, the coin releaser flag FK in the RAM 6 is checked (step 925) and, if the flag FK is found to be reset, whether the withdrawal transaction requires coins or not is checked (step 931). In the case of transaction requiring no coins regardless of valid or invalid coin releaser 15, either the bill releaser 14 or the coin releaser 15 is driven, and the amount of money indicated by the data in the areas MF 1 and MF 2 of the RAM 6 is paid to the customer (steps 926, 927, 928 and 929). Then, this routine (31) is completed and an advance is made to routine (32).

If any disagreement in data is detected during the step 916 described above, the bankbook is returned if the disagreement is the first one (steps 921 and 923) but the teller is called for the teller's processing if the disagreement is the second one (step 922). Also, in the steps 925 and 930, if the coin releaser 15 is invalid and the coins are determined to be needed for a withdrawal transaction, then teller's processing is called for (step 931).

Also, at the stage of each operation in the business output control routine (31), the guide display device 16 is operated and the operation to be performed by the customer is displayed sequentially in a manner easily understandable to the customer. However, since this kind of guide display is already well known in automatic cash paying machines or dispensers, no description will be made for the guide display in this specification.

The basic configuration of the bank transaction processing system of the present invention and its operation by handling the bankbooks have been described above. As apparent from the description made up to now, a transaction proposed by a customer is accepted by the teller, then the teller enters the business data received using the input device at the teller side device A, and these business data are stored in the first memory which is used as preprocess memory (areas MA, MB and MC and flags FT and FB of RAM 4). Then, when the teller enters a key input for "input completion", the business data in the first memory are transferred to the second memory used as memory for making decisions (area ME 1 of RAM 6). These transferred business data are transmitted to the central device, and the return data for these business data from the central device are stored in another area in the second memory (area ME 2 of RAM 6) and also displayed on the teller's display device 7. At this stage, the teller may begin to handle an input for a next customer. When the afterprocess for one transaction is completed at the customer side device B, the data in the second memory are transferred to the third memory used for the afterprocess (areas MF 1 and MF 2 of RAM 6), and then the operation of afterprocess by the customer is awaited. As described above, according to these devices of the present invention, the transaction processing for three customers in total can be performed in parallel by a teller T; one of customers (customer C1 of FIG. 2) corresponding to the third memory, the other customer (customer C2 in FIG. 2) corresponding to the second memory, and the other customer (customer C3 of FIG. 2) corresponding to the first memory; so that the processing capacity can be greatly improved compared to that of conventional way in which the teller is required to perform the processing serially and sequentially for each customer from beginning to end. In addition, it is possible to handle more than three customers at the same time if such a configuration is provided in which areas for plural transactions are assigned in the third memory and the business and return data in each area are sequentially shifted during routine (23).

Also, the number of customers for whom the processing is performed at the same time can be limited to two if such a configuration is provided in which an input for a new customer is not permitted at the teller side device A until the afterprocess based on the business data in the third memory will be completed even though the communication with the central device has been already completed for the business data in the second memory.

Also, the overall efficiency of the afterprocess can be improved if the afterprocess (printing of bankbook) for a ordinary deposit transaction based on a bankbook is prohibited at the customer side device B shown in the figures, and the afterprocess for printing the deposit transaction only on the bankbook is performed at a special purpose afterprocessing device such as well-known bankbook printing device in the system configuration.

When coins all gone or an insufficient amount of coins in the coin releaser 15 is indicated to the teller, the main switch of the coin releaser 15 is turned off and said device 15 is invalidated. If under this condition the teller enters an input of withdrawal transaction requiring the operation of the coin releaser 15, then a display meaning "the transaction input is invalid because of no coin left" is made on the teller's display device 7 and the input is rejected. Because of this, the customer will perform the afterprocess by himself, and any trouble such as unpaid coins when these have to be actually paid can be prevented.

Other functions and features of the bank transaction processing system of the present invention will be now described in detail hereinafter.

Figure 11:
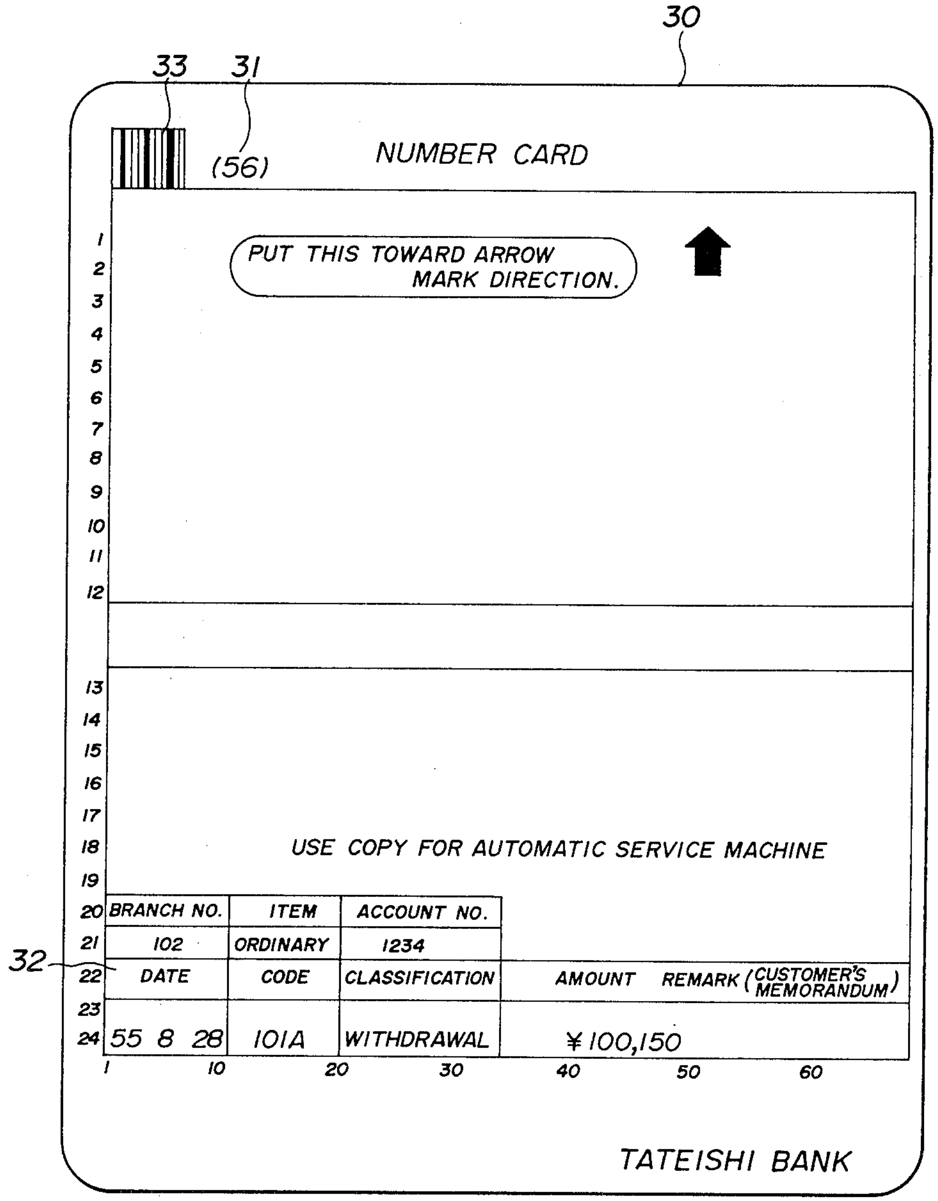
FIG. 11 is a plan view of a number card of the present invention.

According to this bank transaction processing system, if a customer forgets to bring the bankbook with him, he may report it to the teller and his transaction processing can be performed as long as the teller has approved it. In this case, however, the teller will issue a number card that may be used as bankbook. FIG. 11 shows an embodiment of this number card. The shape and size of the number card 30 are the same as those of the open bankbook and the number card has an individual transaction number 31 and printing columns 32 for account number, date, contents of transaction and so forth. This number card 30 has no magnetic stripe for recording data as used for the bankbook but, instead, has a number card data section 33 which expresses said transaction number 31 in the form of a bar code for mechanical reading. Now the preprocess based on the number card will be described hereinafter by referring to FIG. 8. The teller will first enter an input indicating the transaction based on the number card on the keyboard 9. Then, the control in the CPU 1 advances from step 801 to step 814 and then to step 815, and a decision of NO is made in this step 815. Then, the teller will operate the keyboard 9 and enter both the account number and transaction number for the number card 30 to be given to the customer (step 817). These input data are stored in the area MC of the RAM 4. This input will also set the number card flag FB in the RAM 4 (step 818). The bankbook flag FT will remain reset. After this, the operation by the teller and response operation of the CPU 1 as same as those of bankbook will be performed, and the amount of deposit or withdrawal and so forth will be entered thereafter.

When the number card flag FB is set as described above and the business data by which the bankbook flag FT was reset are sent to the central device during routine (20) in the process (c) of the CPU 2, this transaction based on the number card without using a bankcard is recognized at the central device on the basis of status of the flags FB and FT so that no updating of file data for processing the bankbook is performed.

In addition, the business output control routine (31) shown in FIG. 9 is executed as described below for said business data for which the flag FB is set and flag FT is reset already. When the setting of the flag FB is detected in the CPU 2 during step 901, an indication saying "insert the number card to bankbook processor 13" in displayed on the guide display device 16, and the insertion of the number card is awaited. When the number card is inserted (step 902), whether it is a number card or not is confirmed by the fact that no data are read by the reader for the bankbook (with magnetic stripe) (step 903). If any bankbook data are read out, the bankbook is returned (step 909). If the object inserted is found to be a number card, the transaction number is read out from the number card data sector 33 (step 904), and whether the transaction number read out will agree with the transaction number in the area MF 1 of RAM 6 is determined (step 905). If both transaction numbers agree with each other, the contents of this transaction and so forth are printed on the number card based upon the data in the areas MF 1 and MF 2 of RAM 6 (step 906), and the number card is returned (step 907). Then, the customer will pull this out (step 908). Thereafter, a decision of NO is made at step 912 since the bankbook flag FT is reset, an advance is made to step 924, and then cash is released if this is a transaction of withdrawal.

As described above, a customer who forgets to bring his bandbook with him can be processed in the flow of highly efficient transaction processing described above by using a number card as an alternative transaction medium and, thus, the system of this invention is extremely flexible in its character.

However, said number card is actually a waiting-list card in nature and a customer who forgets to bring bankbook with him may be processed without using any number card as long as the bank is not crowded with customers and, thus, no waiting is necessary. That is, an input expressing no bankbook and number card can be given at step 814 of the input processing routine (1) of FIG. 8 and the account number of the customer may be entered at step 816. Then, the bankbook flag FT and the number card flag FB for the business data corresponding to that account number will remain reset. If these business data are sent to the central device, no updating processing of file data for printing on the bankbook is performed. Also, when the business output control routine (31) of FIG. 9 is executed for these business data, the operation advances from step 901 to step 912 and then to step 924, so that the processing is completed by doing almost nothing for the deposit transaction and by releasing cash for the withdrawal transaction.

If a read error occurs in the bankbook data at step 803 during input processing routine (1) of FIG. 8 in the bank transaction processing system of this invention, the transaction processing can be smoothly advanced by using said number card together with such an incorrect bankbook. That is, if an read error occurs, then an incorrect bankbook is taken out (step 813), an input expressing the use of number card in combination because of an incorrect bankbook is entered through the keyboard 9 (step 814), the keyboard 9 is operated to enter the account number and the transaction number of the number card to be issued to customer, and then the teller enters the data such as balance and print complete row that can be read from the bankbook. These data are stored in the area MA or MC of the RAM 4, and both the bankbook flag FT and number card flag FB are set. If these business data are sent to the central device, updating processing of file data for printing on the bankbook is performed in the same manner as explained at first for the bankbook handling. For this kind of business data, the business output control routine (31) of FIG. 9 is executed as described below. At first, since the setting of flag FB is detected at step 901, the processing is executed in the following order listed: step 902, step 903, step 904, step 905, step 906, step 907 and step 908. That is, an insertion of number card is instructed to the customer, the transaction number is collated after the insertion of the number card and, if the transaction number agrees, printing is made on the number card and this card is returned. Then, the setting of flag FT is detected at step 912, a guide indication expressing "now insert your bankbook" is displayed to the customer, flag FB is checked again (step 914) after the bankbook is inserted (step 913), reading and collation of the bankbook data of steps 915 and 916 are omitted since the flag FB is set (this bankbook is an incorrect one that caused a read error), printing on the bankbook is made (step 917), bankbook data are updated (step 918), and the bankbook is returned (step 919). When the customer pulls out this bankbook (step 920), an advance to step 924 is made and cash is released if this is a transaction of withdrawal. As described above, an extremely flexible processing will be possible with a high efficiency according to the bank transaction processing system of this invention.

Next, the operation to switch the customer side device B to the automatic cash dispenser mode in which the device B operates as an automatic cash dispenser will be explained hereinafter. When switching the device B to the automatic cash dispenser mode, the teller will enter an input to instruct switching by using the keyboard 9. Then, this mode change command input is detected by the CPU 1 at step 815 during the input processing routine (1) of FIG. 8, and this mode change command is stored in the area MC of the RAM 4. Then, if the teller depresses "completion" key on the keyboard 9 (step 826), an advance to the routine (2) will occur. As described previously, this mode change command responds to the polling from the CPU 2 and is transferred from the CPU 1 to the CPU 2, and then is stored in the area ME 1 of the RAM 6. Then, when the CPU 2 executes the routine (19) of the process (c) of FIG. 5, this mode change command is detected and branched to the side of routine (25). In this routine (25), the resetting of flag F1 of the afterprocess is awaited, the program for automatic cash dispenser mode previously stored in the external memory unit 22 is read in the program area of the RAM 6 during routine (26) upon completion of resetting of the flag F1, and this program is executed when reading is completed. Then, the device B begins to operate as an automatic cash dispenser with added functions of the card reader 17, slip issuer 18 and keyboard 19 instead of operating solely as an afterprocess device previously described. Since the automatic cash dispenser is widely being used and its configuration and operation are well known, it will be not described in this specification. As described above, this bank transaction processing system can be operated not only as a highly flexible and efficient system with preprocess and afterprocess functions divided as described before but also as ordinary automatic cash dispenser, thereby allowing different ways of use of the system by time zone with much improved adaptability.

An example of operation of reading of program from the external memory unit 22 to the RAM 2 will be described below in detail. When the power of the customer side device B is turned on, the CPU 2 executes the basic program stored in the ROM 5 and the contents of a program setter X provided in the external memory unit 22 are read in an accumulator, a program whose number is expressed by the contents of the accumulator is read from the external memory unit 22 to the RAM 6, and then this program is executed from its beginning. The number of program for the afterprocess mode is set in said program number setter X. Also, when the routine (26) of the process (c) of FIG. 5 is executed by said mode change command, the contents of the program number setter Y are first read in the accumulator, then a program whose number is expressed by the contents of this accumulator is read from the external memory unit 22 to the RAM 6, and this program is executed from its beginning. The number of program for the automatic cash dispenser mode is set in said program number setter Y. As recording medium for the external memory unit 22, a medium such as cassette tape may be used but it is naturally not limited to the cassette tape. Also, the program changing method is not limited to two embodiments explained above, and the same function may be realized by other kinds of methods.

Figure 12:
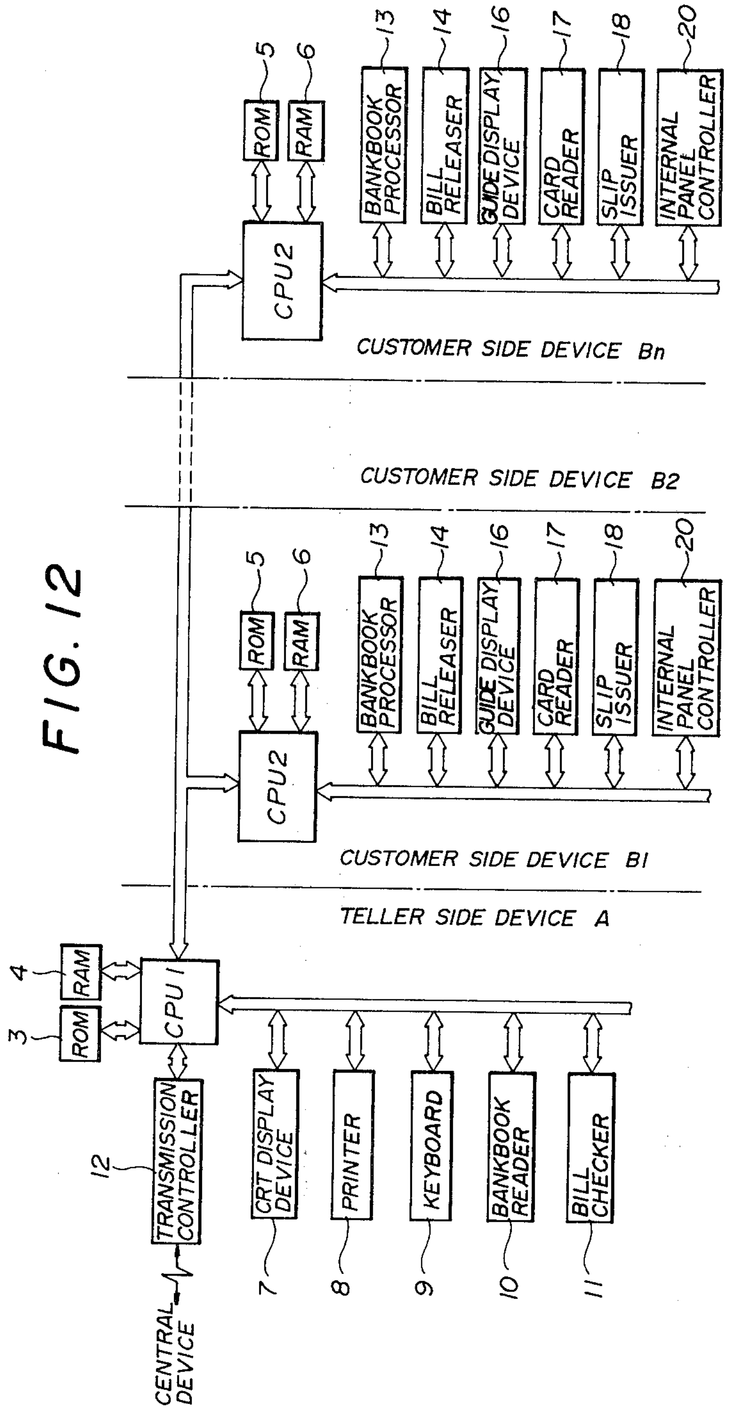
FIG. 12 is an overall block diagram of another embodiment of bank transaction processing system of the present invention.

In another embodiment of the bank transaction processing system of the present invention shown in FIG. 12, plural customer side devices B1, B2 . . . Bn are connected to one teller side device A. A transmission controller 12 which communicates with the central device is connected to the CPU 1 in this system. The business data for which the communication with the central device has been completed are stored in RAM 4. This RAM 4 has a capacity sufficiently large for storing a number of the business data. A customer who completed his own preprocess may be able to perform his afterprocess at any time he likes at one of plural customer side devices B1, B2 . . . Bn. If the customer inserts his bankbook and so forth to the customer side device Bi to perform his afterprocess, a request for transfer of business data corresponding to the bankbook is made from CPU 2 of the device Bi to the CPU 1. Then, in response to this request, the CPU 1 searches corresponding business data in RAM 4, and these corresponding data are transferred to the CPU 2 of the device Bi. After receiving these business data, the CPU 2 of the device Bi begins to execute the afterprocess.

As described in detail hereinbefore, when the transaction processing system of the present invention is used, the clerk is required to perform only the preprocess which really requires clerk's operation at the clerk side device, simple and unified afterprocess for which customer's operation is permitted can be performed using the customer side device, and the preprocess by the clerk can be performed in succession for plural customers even though the afterprocesses by some customers are delayed. Therefore, the extremely flexible processing with the intervention by clerk can be performed with an extremely high efficiency, and the overall efficiency of the work at the clerk's counter in bank can be greatly increased.

As many apparently widely different embodiments of this invention may be made without departing from the spirit and scope thereof, it is to be understood that the invention is not limited to the specific embodiments thereof except as defined in the appended claims.

What we claim is:

1. Transaction processing system, comprising in combination:

tellerside processing means to be operated by a teller for executing processes in the first portion out of a series of processes defining a transaction, including an input device for transaction data in the first portion of a transaction, a first memory for storing said transaction data, and a tellerside display device for displaying said transaction data and the results of a decision about the validity of the transaction;

customerside processing means to be operated by a customer for executing processes in the latter portion of said series of processes including a third memory for storing transaction data in the latter portion of a transaction and a guide display device for displaying the operation procedure to said customer;

decision control means having a second memory for receiving the transaction data from said first memory to be used for making a decision, receiving the decided transaction data from a central device and waiting until the occurrence of a vacancy in said third memory;

communication control means for transmitting said transaction data stored in said second memory for making said decision, receiving return data including said decided transaction data returned from said central device in response to said transmission and storing said return data in said second memory, and displaying the results of the decision about the validity based upon said decided transaction data to said tellerside display device; and transfer means for transferring said transaction data to said third memory from said second memory after said results of decision.

2. The transaction processing system as in claim 1 wherein, said tellerside processing means includes a keyboard as said input device, a bill checker and a bankbook reader;

and saud customerside processing means includes a bankbook processor containing a bankbook reader and a bankbook printer, a cash releaser combined with said bankbook processor, and business output control means for comparing bankbook data read out by said bankbook reader with data stored in said third memory and, upon detection of a predetermined agreement from the comparison, operating said bankbook printer and said cash releaser in response to the data in said third memory.

3. The transaction processing system of claim 2, said bankbook processor including means for reading a number card recorded with an individual number as a medium of transaction alternative to the bankbook;

and said business output control means includes means for performing a predetermined business output control means after an input of a number with a number agreeing to a transaction number of said number card whenever the transaction number having been contained in the business data.

4. The transaction processing system of claim 2, said cash releaser being provided with a bill releaser and a coin releaser;

and said tellerside processing means including receive-inhibiting means for inhibiting the reception of business data requiring the coin releaser when said use of coin releaser has been invalidated, and displaying this inhibition on said tellerside display device.

5. The transaction processing system of claim 2, said customerside processing means including a card reader, a slip issuer, a keyboard and control means for operating said customerside processing means as an automatic cash dispenser in response to a predetermined switching operation.

6. The transaction processing system of claim 1 or 2, wherein said second and third memorys are different areas of a single RAM.

7. The transaction processing system of claim 1 or 2, including a plurality of said customerside processing means.

* * * * *